(12) United States Patent
Erdogan et al.

(10) Patent No.: US 8,447,948 B1
(45) Date of Patent: May 21, 2013

(54) DYNAMIC SELECTIVE CACHE COMPRESSION

(75) Inventors: Ozgun A. Erdogan, Seattle, WA (US);
Giuseppe deCandia, Seattle, WA (US);
Tobias L. Holgers, Seattle, WA (US);
Vishal Parakh, Seattle, WA (US);
Benjamin WS Redman, Seattle, WA (US)

(73) Assignee: Amazon Technologies, Inc, Reno, NV (US)

( * ) Notice: Subject to any disclaimer, the term of this patent is extended or adjusted under 35 U.S.C. 154(b) by 970 days.

(21) Appl. No.: 12/110,121

(22) Filed: Apr. 25, 2008

(51) Int. Cl.
*G06F 12/00* (2006.01)

(52) U.S. Cl.
USPC ............ 711/173; 711/129; 711/153; 711/159

(58) Field of Classification Search
USPC .................................. 711/129, 173, 159, 153
See application file for complete search history.

(56) References Cited

U.S. PATENT DOCUMENTS

| | | | | |
|---|---|---|---|---|
| 5,586,291 A | * | 12/1996 | Lasker et al. ................. | 711/113 |
| 6,324,621 B2 | * | 11/2001 | Singh et al. ................... | 711/129 |
| 7,412,564 B2 | * | 8/2008 | Wood et al. ................... | 711/118 |

OTHER PUBLICATIONS

Ian Melsom,"Economic evaluation manual vol. 1", Oct. 2007, pp. 1.1-2.31.*
Sandro Saitta, Data Mining Research: Standardization vs normalization, Jul. 2007, http://www.dataminingblog.com/standardization-vs-normalization/.*

* cited by examiner

*Primary Examiner* — Kalpit Parikh
(74) *Attorney, Agent, or Firm* — Novak Druce Connolly Bove + Quigg LLP

(57) ABSTRACT

Management of a data cache having a compressed portion and an uncompressed portion by adaptively and dynamically allocating the relative amount space each portion receives. The relative sizes are defined based on one or more cost metrics and benefit metrics. The metrics are selected based on the performance of an application utilizing the cache. An optimized benefit relative to the cost is defined. Application operations on the cache are sampled and the relative cost and benefit is determined for different ratios of uncompressed to compressed cache sizes. The size of the uncompressed portion relative to the compressed portion is then re-adjusted based on an optimal cost-to-benefit ratio for the application.

24 Claims, 9 Drawing Sheets

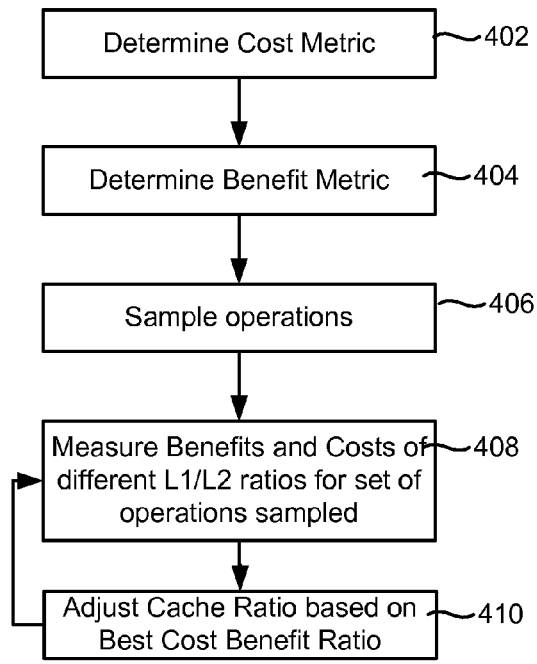
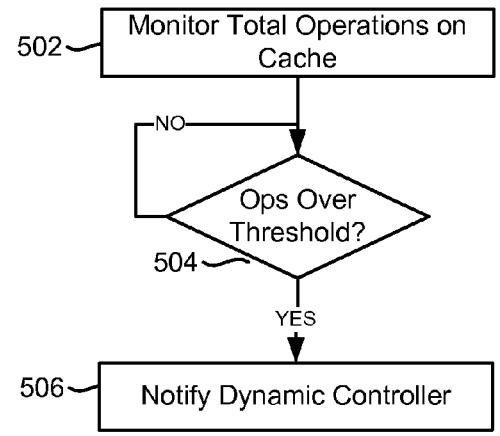
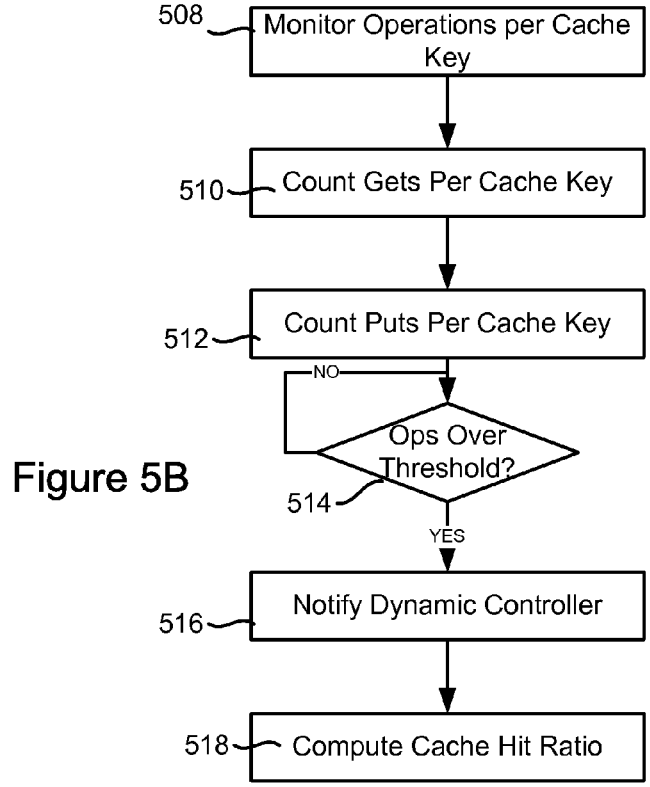
Figure 4
Figure 5A
Figure 5B

| 4 MB | | | | | |
|---|---|---|---|---|---|
| L1 Ratio | % Hit Ratio | % CPU Util | Norm. Ben | Norm. Cost | Ben/Cost |
| 100 | 27.8651 | 0 | 0 | 0 | |
| 80 | 30.0164 | 0.39295 | 0.214171 | 1 | 0.214171 |
| 67 | 31.6431 | 0.391351 | 0.376115 | 0.995931 | 0.377652 |
| 50 | 33.6908 | 0.388049 | 0.579972 | 0.987528 | 0.587297 |
| 33 | 35.3738 | 0.385315 | 0.747521 | 0.98057 | 0.762333 |
| 20 | 36.4606 | 0.384716 | 0.855716 | 0.979046 | 0.874031 |
| 0 | 37.9099 | 0.385288 | 1 | 0.980501 | 1.019886 |

Figure 10

| 128 MB | | | | | |
|---|---|---|---|---|---|
| L1 Ratio | % Hit Ratio | % CPU Util | Norm. Ben | Norm. Cost | Ben/Cost |
| 100 | 53.6991 | 0 | 0 | 0 | |
| 80 | 55.2542 | 0.23627 | 0.360687 | 0.815053 | 0.442531 |
| 67 | 56.1824 | 0.236904 | 0.575971 | 0.81724 | 0.704776 |
| 50 | 57.0098 | 0.240642 | 0.767877 | 0.830135 | 0.925002 |
| 33 | 57.5319 | 0.245387 | 0.888971 | 0.846504 | 1.050168 |
| 20 | 57.8211 | 0.251168 | 0.956048 | 0.866446 | 1.103413 |
| 15 | 57.883 | 0.254883 | 0.970405 | 0.879262 | 1.103659 |
| 10 | 57.9311 | 0.258482 | 0.981561 | 0.891677 | 1.100803 |
| 5 | 57.9787 | 0.265866 | 0.992601 | 0.917149 | 1.082268 |
| 0 | 58.0106 | 0.289883 | 1 | 1 | 1 |

| 256 MB | | | | | |
|---|---|---|---|---|---|
| L1 Ratio | % Hit Ratio | % CPU Util | Norm. Ben | Norm. Cost | Ben/Cost |
| 100 | 57.4028 | 0 | 0 | 0 | |
| 80 | 57.9736 | 0.204719 | 0.7890517 | 0.707604 | 1.115104 |
| 67 | 58.0678 | 0.210089 | 0.9192701 | 0.726165 | 1.265924 |
| 50 | 58.0693 | 0.22001 | 0.9213437 | 0.760457 | 1.211566 |
| 33 | 58.0874 | 0.230224 | 0.9463644 | 0.795761 | 1.189257 |
| 20 | 58.1052 | 0.239521 | 0.9709704 | 0.827896 | 1.172817 |
| 0 | 58.1262 | 0.289313 | 1 | 1 | 1 |

DYNAMIC SELECTIVE CACHE COMPRESSION

BACKGROUND

A cache is a block of memory for temporary storage of data likely to be used again. Caches are used in a number of applications where frequently accessed data can be stored for rapid access including, but not limited to, central processing units (CPU), hard drives, web browsers, content delivery networks and web servers. The cache is made up of a pool of entries, each entry having a piece of data which is a copy of data stored in a backup data store. Each entry also includes a key which specifically identifies the data. When a client wishes to access the data, it first checks the cache and if the entry can be found with a key matching that of the desired data, the cache data in the entry is used instead. This is referred to as a cache hit. A success in the use of the cache can be measured by a hit rate or hit ratio of the cache. The hit ratio is the ratio of accesses satisfied by cache to the total number of accesses. When the cache is consulted and not found to contain a piece of data with the desired key, this is known as a cache miss. Typically, caches have limited storage. Caches may therefore eject some entries in order to make room for others. A number of different heuristics are utilized to determine whether to eject or include an entry in the cache. These heuristics are generally referred to as replacement policies.

Caches may also be divided into levels. A level one (L1) cache is typically a higher performance cache than a level two (L2) cache. Typically, the L2 cache is a secondary staging area that feeds objects to the L1 cache. Other levels of cache memory are possible.

Memory compression has been utilized in operating system memory management and virtual memory systems to create uncompressed and compressed memory pages in order to improve the performance of applications running in computers. Compressed caching is a technique that uses parts of the available cache to hold data entries in a compressed form, effectively adding a new level cache to the system. The sizes of respective uncompressed and compressed caches have been adapted to applications in virtual memory systems.

BRIEF DESCRIPTION OF THE DRAWINGS

FIG. 4 is a flow chart illustrating a method implementing a step of dynamically determining the ratio of an uncompressed to compressed cache in accordance with the technology discussed herein.

FIG. 5A is a first alternative for implementing sampling operations in block 706 of FIG. 4.

FIG. 5B is a second alternative for implementing sampling operations in the method disclosed in FIG. 4.

FIG. 10 is a table representing the data resulting from the method of FIG. 6 in a 4 MB cache.

FIG. 11 is a table representing the data resulting from the method of FIG. 6 in a 128 MB cache.

FIG. 12 is a table representing the data resulting from the method of FIG. 6 in a 256 MB cache.

DETAILED DESCRIPTION

Technology is disclosed to optimize memory management for environments using cache memory; namely, applications, operating systems and databases. The method for managing a data cache is particularly suited for use in an application server, such as a web application server, which responds to data requests from various users. However the techniques disclosed herein may be broadly applied to database and operating system cache management with equal benefit. In accordance with the technology, a caching environment is divided into an uncompressed portion and a compressed portion. Entries are placed in the uncompressed or compressed portions based on one or more replacement policies. The technology dynamically allocates the relative amount space for the uncompressed and compressed areas the cache. To perform this allocation, one or more cost metrics and benefit metrics are defined. The cost metric and the benefit metric are selected based on criteria that are suitable to achieve a programmer's operational goals with respect to the applications utilizing the cache. An optimized benefit relative to the cost is defined. Application operations on the cache are sampled and the relative cost and benefit is determined for different ratios of uncompressed to compressed cache size. The size of the uncompressed portion relative to the compressed portion is then set based on an optimal cost-to-benefit ratio for the application.

Different cost and benefit metrics can be utilized for different applications, and the uncompressed-to-compressed ratio determined based on the needs of a particular application and the goals of the programmer. In a further embodiment of the technology, the steps of determining the cost and benefit values and setting the ratio is performed dynamically during the operation of the cache. In this manner, the ratio of uncompressed to compressed portions of the cache may be continuously updated.

Figure 1:
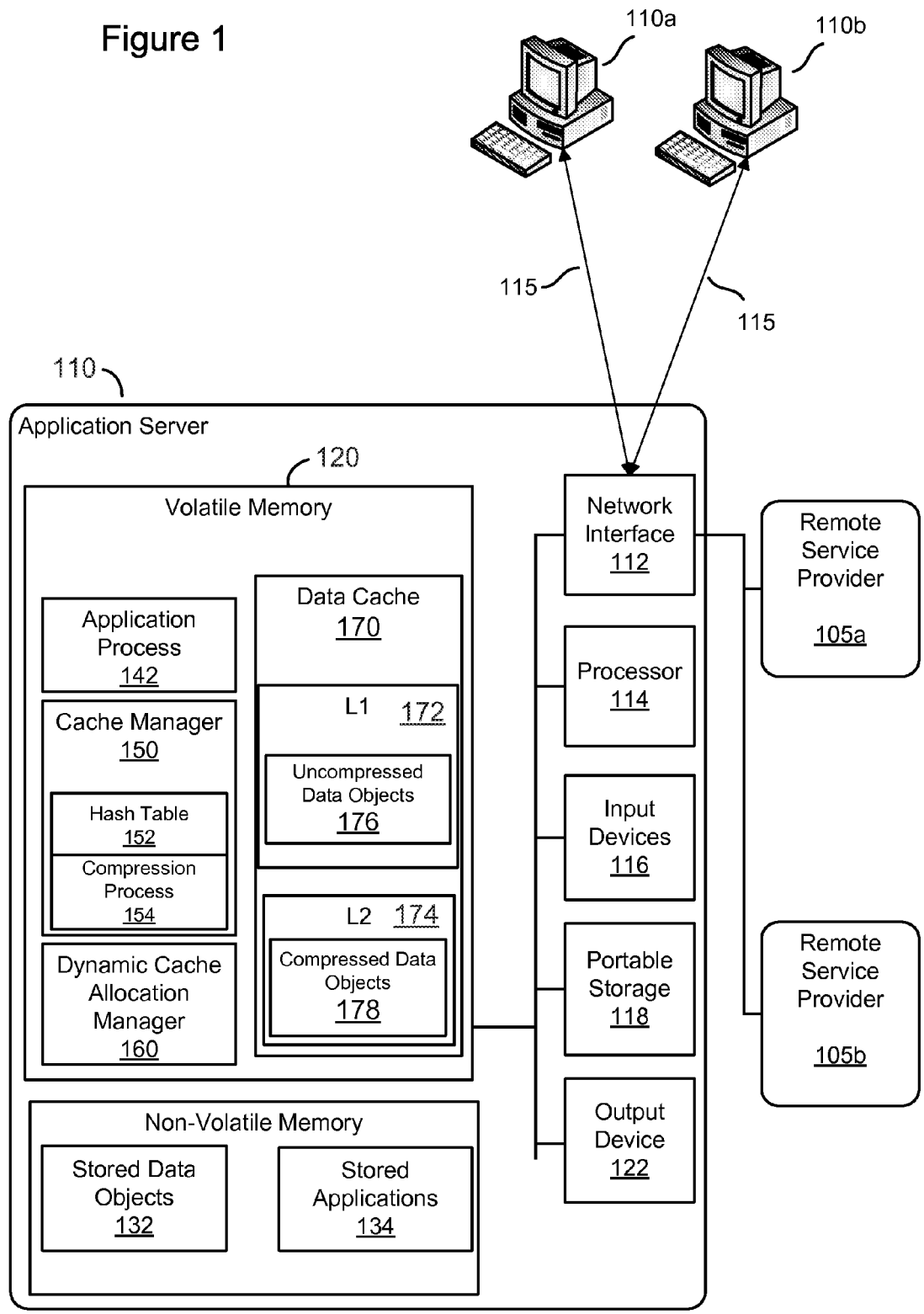
FIG. 1 is an overview of a system for implementing the technology disclosed herein.

FIG. 1 is an example embodiment for implementing the technology discussed herein. The techniques for memory management will be discussed with reference to an application server 110. It should be recognized, however, that the techniques discussed herein may be applied to various other memory management environments including database and operating system cache management environments.

An application server 110 may typically comprise a computing device includes at least a processor (or central processing unit (CPU)) 114, volatile memory 120, nonvolatile memory 130, one or more input devices 116, and one or more output devices 122. Server 110 may further include a network interface 112 and portable storage 118. Memory 120, memory 130 and portable storage 118 are all examples of computer storage media. As used herein, computer storage media includes volatile and nonvolatile, removable and non-removable media implemented in any method or technology for the storage of information such as computer readable instructions, data structures, program modules or other data. Computer storage media includes, but is not limited to, random access memory (RAM), read only memory (ROM), EEPROM, flash memory, and other memory technology, CD ROMs, digital virtual discs (DVDs), and other optical storage, magnetic cassettes, magnetic tape, magnetic disc storage, or other magnetic storage devices or any other medium which can be to store desired information which can be accessed by a computing device 110. Input devices 116 may include a keyboard, mouse, pen, voice input device, touch input device, or the like. Output devices 122 may be visual displays, speakers, printers, and the like.

In operation, volatile memory 120 may include an operating system, one or more application processes 142, a cache manager 150 and a dynamic cache allocation manager 160. A portion of volatile memory 120 may be allocated to a data cache 170 which may include a level 1 (L1) cache 172 and a level 2 (L2) cache 174. As used herein, the L1 cache is an uncompressed data cache including uncompressed data objects 176 while the L2 cache is a compressed data cache including compressed data objects 178. Data cache 170 may be a segregated portion of a bank of volatile memory, or may be provided in a dedicated bank of nonvolatile memory separate and apart from the volatile memory in which the operating system 140 and other applications are resident. In addition, the data cache may or may not include portions of nonvolatile memory 130. Nonvolatile memory 130 may also include stored data objects 132 as well as stored applications 134 and other code instructing the processor to complete operations as described herein.

Application processes 142 may include, for example, a server process performing data operations on behalf of clients 110*a*, 110*b*, which may be connected to the application server 110 via one or more public or private networks 115 via the network interface 112. Calls to the application process 142 are answered by the application process by first checking with the data cache for any data object required to answer the operation, and if the data object is not present, looking to either nonvolatile memory 130 for its stored data object 132, or to remote service providers 105*a*, 105*b*. Remote service providers 105*a*, 105*b* may be separate processing systems which provide data services to the application process 142.

A cache entry manager 150 will typically include a hash table 152 which includes an entry for data objects included in the data cache in a manner well known to those of average skill in the art. The cache entry manager may also include a compression process which is utilized to move objects into and out of the L2 cache 174, as illustrated in FIG. 2.

The dynamic cache allocation manager 160 manages the ratio between the L1 and L2 cache. Operation of the dynamic cache allocation manager is described with respect to FIGS. 3, 4, 5, 6 and 10-12.

The dynamic cache allocation manager 160 sets memory sizes for uncompressed and compressed portions. After the ratio between portions is determined as discussed below, a memory size for each area is defined. The cache entry manager then determines whether there is room for a given entry in the uncompressed or compressed portions.

Figure 2:
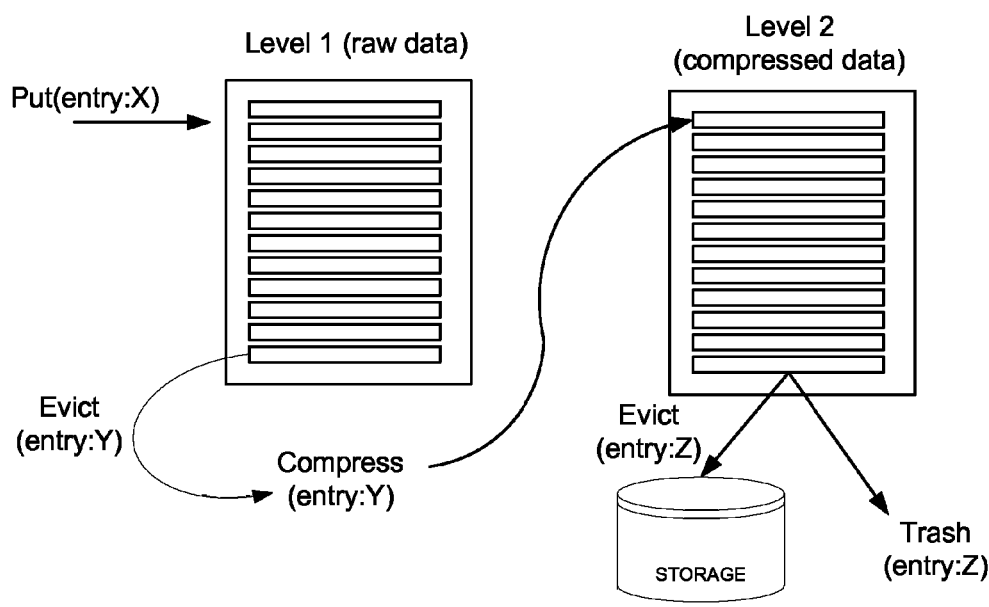
FIG. 2 is a flow chart representing a first embodiment of the method in accordance with the technology disclosed herein.

FIG. 2 illustrates the operation of the L1 and L2 cache in accordance with the present cache replacement technology. In FIG. 2, an LRU algorithm is illustrated, though as discussed herein, other replacement algorithms may be utilized The operations illustrated are those of a, for example, put entry (entry:X) from a client 110*a* through the application process 142. In a typical put operation, if the replacement policy determines that the entry (entry:X) should be placed in the L1 or uncompressed data cache, one or more entries (entry:Y) must be evicted from the L1 data cache due to space constraints. Depending on the particular replacement policy in use, as entry X is placed into the level one data cache, entry Y will be evicted from the L1 data cache. The evicted L1 entry, entry Y, is then placed in the compressed L2 cache. Prior to placement in the L2 cache, entry Y is compressed. To make room for entry y in the L2 cache, the L2 entry (entry Z) will be evicted from the L2 cache and moved to the nonvolatile storage medium 130 or deleted.

Suitable techniques for determining which entries are put into the L1 cache and which are removed from the L1 cache (and likewise which entries are placed into the L2 cache and which are committed to non-volatile storage) are any number of replacement algorithms. These include, but not limited to, a least recently used (LRU) algorithm, a pseudo LRU algorithm (utilizing a probabilistic scheme), a least frequently used (LFU) algorithm, or an adaptive cache replacement policy (which constantly balances between an LRU and LFU). Typically, the same replacement policy is utilized for entries between L1 and L2, and L2 and storage. Suitable methods of compression include, for example, GZIP, Lempel-Ziv-Oberhumer (LZO), Lempel-Ziv-Welch (LZW). Widely known compression schemes spend more time compressing in relation to decompressing. GZIP, LZRW and LZO are tuned for fast decompression speeds, and spend 3× to 5× more time during compression. Hence, the compression technique selected may have an effect on the selection of metrics and the performance of the methods discussed herein.

The development of a compression scheme with a more balanced compression/decompression utilization will potentially reduce the cost; since fewer resources are used for compression, compressing entries and inserting them into the L2 cache will be cheaper. As a result, the above techniques result in a lower initialization time for the L2 cache.

Figure 3:
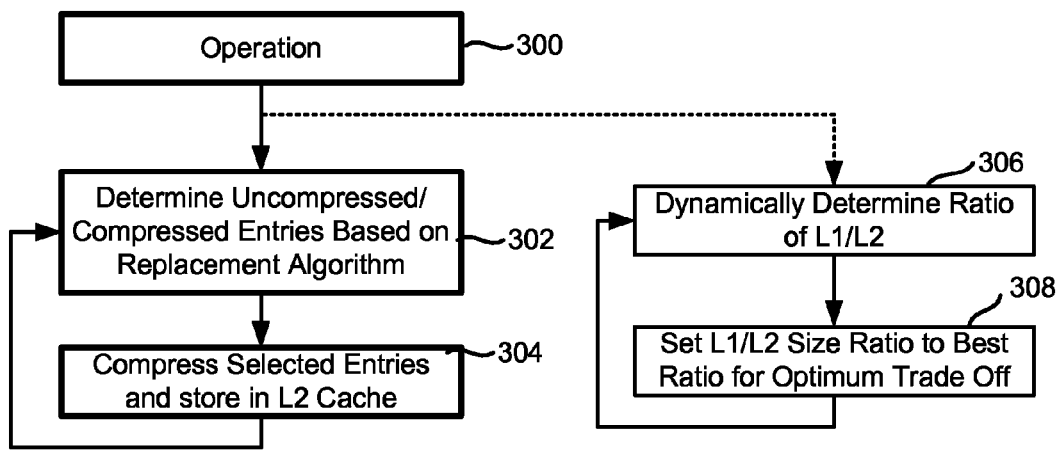
FIG. 3 is a block diagram illustrating entries put into and removed from a level one (L1) and level two (L2) cache.

FIG. 3 illustrates a first method implemented in accordance with the present technology for managing data cache. An operation 300 will be acted on by the cache manager at steps 302 and 304 to maintain the cache state. At block 302, in accordance with the replacement policy, a determination is made as to which cache entries should remain uncompressed versus those entries which can be compressed. This determination is made in accordance with the replacement algorithm in use. In one embodiment, this may include determining the most popular cache entry and allowing such entries to remain in the L1 cache, while placing less popular entries in the L2 cache. At block 304, a set of cache entries is compressed and included in the L2 cache. Steps 302 and 304 are repeated as operations are performed on the cache by the application. In parallel with steps 302 and 304, and at regular or irregular intervals, steps 306 and 308 optimize the cache size ratios. At block 306, the ratio between L1 and L2 is dynamically and adaptively determined based on a defined cost metric and benefit metric. In one embodiment, as explained below, this is performed over a sample of entries of operations performed on the data cache L1 and L2. At block 308, the L1/L2 ratio is set to the optimum ratio for the application. The method is dynamic in that steps 306 and 308 are repeated continuously during the operation of the cache so that the ratio can change based on changes in the selected metrics, maximum benefit to cost ratio or operations by the application on the cache. The method is adaptive in that different metrics as well as the cost-benefit ratio can be modified based on the application's characteristics and operations performed on the cache to achieve the designer-selected tradeoffs.

In general, cache compression trades memory space at the expense of CPU cycles. As a result, those metrics which may be utilized as costs and benefits generally surround CPU processing time and memory utilization. Compression reduces each cache entry's size. The compression techniques discussed above achieve compression ratios of about 3 to 1. But compression and decompression cost CPU cycles and results in added latency. In a typical application, tens-to-thousands of cache reads may be required to render a web page for a client 110.

As discussed below, step 306 determines the L1/L2 ratio based on selected metrics suitable for tuning the performance of the application relative to the sizes of the L1 and L2 cache. In general, compression has two types of costs associated with it. The first type of cost impact is the latency added to a given operation. Increased latency results from a cache entry in the L2 cache requiring compression prior to entry in the cache or decompression prior to being returned to an application. A second type of cost associated with compression is CPU utilization. Since the L1 cache contains objects that are generally accessed more often or more recently than the L2 cache, the L1 cache may filter out a significant number of decompression operations.

There are a number of benefit metrics which may be chosen from. One such metric is the cache hit ratio. As used herein, the cache hit ratio is the ratio of operations satisfied by the cache to the total number of operations. More compression will generally lead to a higher cache hit ratio. Generally, full compression of the cache will provide the best benefit in terms of cache hit ratios. However, full compression of the cache will also provide the highest cost in terms of CPU utilization. Each extra cache hit saves a call to a remote service device and therefore saves remote resources. A third metric for measuring benefits is effective memory usage. Selective cache compression knows the size of each entry before and after compression and can record uncompressed and compressed sizes for all entries in the cache and measure the increase in effective memory as the L1 to L2 ratio is varied. In accordance with the technology, any one or more of the costs and benefits metrics can be utilized. As noted above, utilizing GZIP compression on average achieves a 2.6 to 1 compression ratio.

FIG. 4 shows one method in accordance with the present technology for adaptively and dynamically determining the ratio of L1 versus L2. At steps 402 and 404, a cost metric and a benefit metric, respectively, are defined. The cost metric may be any of a number of cost metrics such as those described herein, or additional cost metrics depending upon the architecture or application for which the technology is to be utilized. The benefit metric may likewise be one of those discussed herein or an additional benefit metric depending upon the application for which the technology is utilized.

At block 406, sampling of the operations impacting the cache is performed. Operations may include service calls, cache gets, and cache puts from an application. It will be recognized that the specific architecture of the application and computing environment may have an impact on how particular cost or benefit metrics impact these operations. For example, in some environments different types of operations may have a negligible impact on both cost and benefit. One example is where remote service calls are performed asynchronously and therefore have no impact on latency.

Sampling operations at block 406 provides a representation of the applications operations on the cache environment. Sampling provides an advantage in that the computational time required to perform adjustments to the L1/L2 ratio can be reduced and ensures no degradation in the performance of the real cache. The size of the sample can be varied to provide a more accurate representation of operations on the cache. FIGS. 5A and 5B illustrate different sampling operations and are discussed below.

After acquiring a set of sample operations, at block 408, a measurement of the benefits and costs of a plurality of different L1 and L2 ratios for the operations sample is performed. After measuring the benefits and costs, the cache ratio between L1 and L2 is adjusted based on the best cost to benefit ratio at block 410. The best cost to benefit ratio will be decided by an administrator or application designer based on the application in use and the technology.

FIG. 5A illustrates a first method for sampling operations on the cache. At block 502, all operations including service calls, cache gets and cache puts are monitored. At block 504, once a threshold number of combined operations is reached at block 504, the dynamic controller is notified at block 406 to begin the block of dynamically determining the ratio of L1 and L2 (block 306).

A more involved method of sampling which allows segregation of operations and provides additional monitoring flexibility for operations on the cache is disclosed in FIG. 5B. At block 508, a monitoring process monitors the number of operations per cache key. As will be readily understood, each object resident in a data cache is associated with a cache key, and access to the object is controlled by the cache key. At steps 510 and 512, the number of gets and puts, respectively, per individual cache key is counted. At block 514, after the total number of operations, or one of either the total number of gets or puts—depending on a designer selected configuration—is over a threshold, the dynamic controller is notified at block 516. At block 518, the cache hit ratio based on the current size of the cache can be computed.

FIG. 5B represents a deterministic sampling of operations on the cache allowing one to track operations on individual entries in the cache. In an alternative embodiment, operation sampling may be entirely random. Other forms of statistical sampling of operations may be suitable for use accomplishing step 406.

Figure 6:
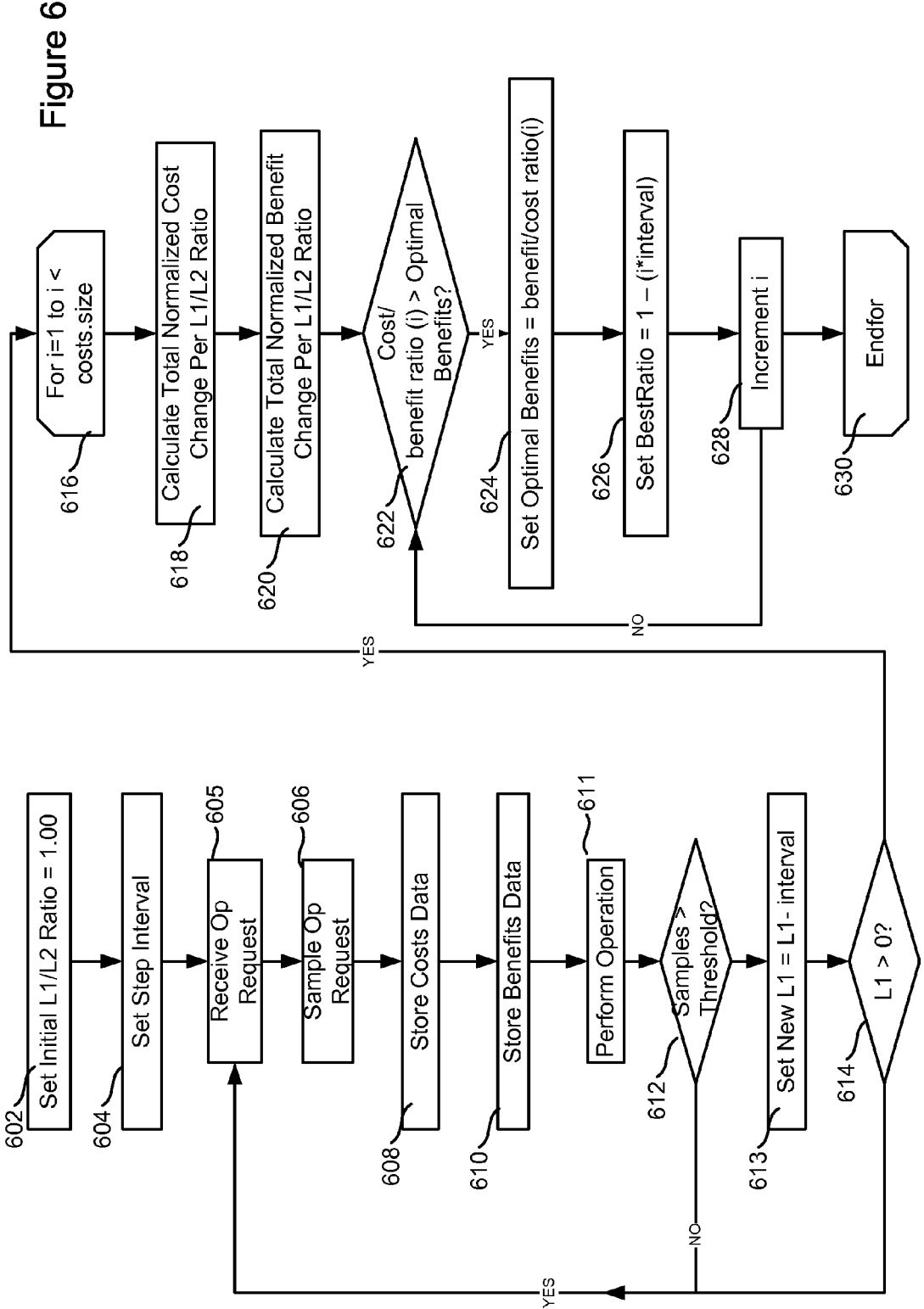
FIG. 6 is a flow chart illustrating a step of measuring the costs and benefits of different uncompressed to compressed cache ratios for a given set of sampled operations.

FIG. 6 illustrates a method in accordance with the technology for measuring the costs and benefits of the different L1 and L2 ratios for the set of operations sampled at block 406. In accordance with the technology, FIG. 6 illustrates one method for performing block 408, discussed above. FIGS. 10-12 illustrate the data gathered and calculated in FIG. 6 and will be discussed in conjunction with FIG. 6.

At block 602, an initial L1/L2 ratio of 1.00 is set. A ratio of 1.00 indicates a completely uncompressed cache. At block 604, a step interval is selected. The step interval is an interval by which the L1 to L2 ratio will be decremented during the method of FIG. 6. At each interval, metric values will be determined for the sample set. In one embodiment, the step interval can be 0.05; as such, at the ratio will be decremented by 0.05 for each pass of the loop represented by steps 605-614 described below. Any interval may be selected depending on the granularity of control one seeks to achieve.

At step 605, an operation request from the application will occur. At step 606, the operation will be sampled and at steps 608 and 610 a cost value and a benefit value, respectively, are stored and associated with the corresponding L1 to L2 ratio. An example of the data recorded is illustrated in FIGS. 10, 11 and 12. For each size of the L1 cache, an associated cost value and benefit value are recorded.

At step 611, the requested operation is performed.

At block 612, if additional samples are required, the method returns to step 605. If enough samples for the current L1/L2 ratio have occurred, at step 613 the L1/L2 ratio is incremented and a new L1 to L2 ratio is set as equal to the current ratio minus the block interval. At block 614, as long as the ratio is greater than zero, steps 605, 606, 608, 610, 611 and 612 are repeated for each of the incremented L1 to L2 ratios.

Once L1 reaches zero, at step 614, a set of cost and benefit values for each of the plurality of ratios measured in steps 606-614 exists. This is illustrated in the columns Cost Data and Benefit Data in FIGS. 10-12. This data is derived from FIGS. 6 and 4 respectively. At block 616, for each cost/benefit measurement in the stored array, a normalized cost change at block 615 and a normalized benefit change at block 620 are calculated.

Because costs and benefits are measured against different units, a direct comparison of cost and benefit values would result in highly skewed results. Hence, in one embodiment of the technology, costs and benefits are normalized to one. For example, if CPU utilization is taken as a cost metric and cache hit ratios as a cost benefit, (for example, in FIGS. 7 through 9 below,) the difference between no compression and full compression for cache hit ratios is 4.65 percent but only 0.3 percent for CPU utilization. When the increase in hit ratios and CPU utilization are normalized against 1.0, if the CPU utilization increases by 0.15 percent, the normalized cost will be 0.5, or half the value of the total cost.

In block 615, the normalized cost change is the normalized cost measured for a given ratio less the normalized cost at the initial ratio of 1.00 ((costs[i]−costs[0])/total costs). Likewise, the normalized benefit change (block 620) is the normalized benefit value less the benefit value at the initial ratio of 1.00 ((benefits[i]−benefits[0])/total benefits). Examples of the normalized cost change and benefit change are given in the columns "Δ N Cost" and "Δ N Benefit" in FIG. 10.

In the above example, costs and benefits are normalized to 1. However, normalization can be extended in several ways. One extension is setting the normalization coefficients dynamically. For example, additional CPU resources may be available during different time periods. At certain times of the day, CPU costs may be considered to be cheaper. In this scenario, the technology disclosed herein can attach more CPU resources at night, and compress a larger segment of the cache.

At block 622, if the benefit to cost ratio change for a given L1/L2 ratio exceeds a maximum, then the maximum benefit or optimal value will be set equal to the cost/benefit ratio (i) and the best ratio of L1/L2 will be set to that which achieves this maximum benefit or optimal value. This ratio is equal to one minus i times the block interval at block 626. This FOR loop completes when all values in the table generated by steps 606-614 complete and the Best Ratio is returned to the dynamic controller.

Referring to FIG. 4 after a best ratio value is returned, steps 408 and 410 may be repeated. Alternatively, steps 406-410 can be repeated. Sampling at step 406 may be performed in parallel with the calculations being performed at step 408 so that once a best ratio is returned, a new sample set of data may be utilized for a subsequent computation. In yet another alternative, steps 406 and 408 may be repeated on a plurality of uncompressed/compressed ratios as discussed above, but where these ratios are represented as a search tree, and are explored using an heuristic, such as a branch and bound algorithm. Still further, projected cost values and benefit values can be derived from the measured values by extrapolation, and the measured and projected values utilized in the comparison for optimization in accordance with the analysis at steps 622-628.

Figure 7A:
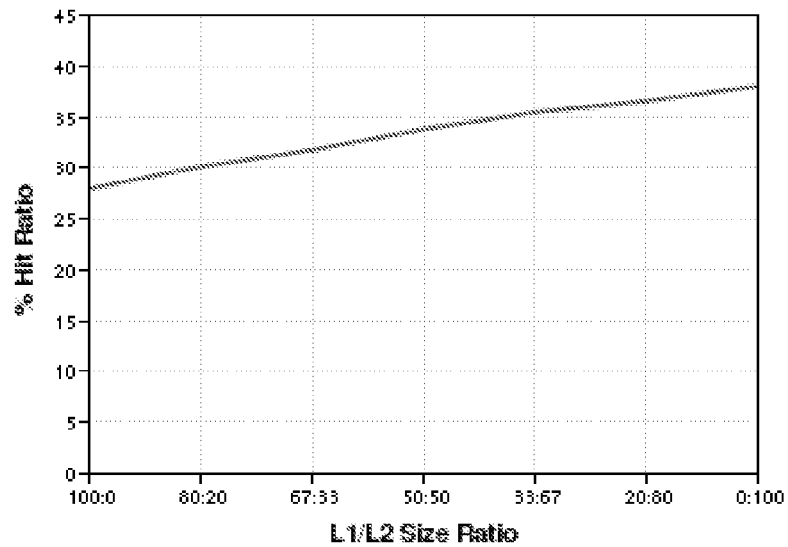
FIG. 7A is a graph of the hit ratio versus the uncompressed to compressed cache size ratio for a 4 MB cache.
Figure 8A:
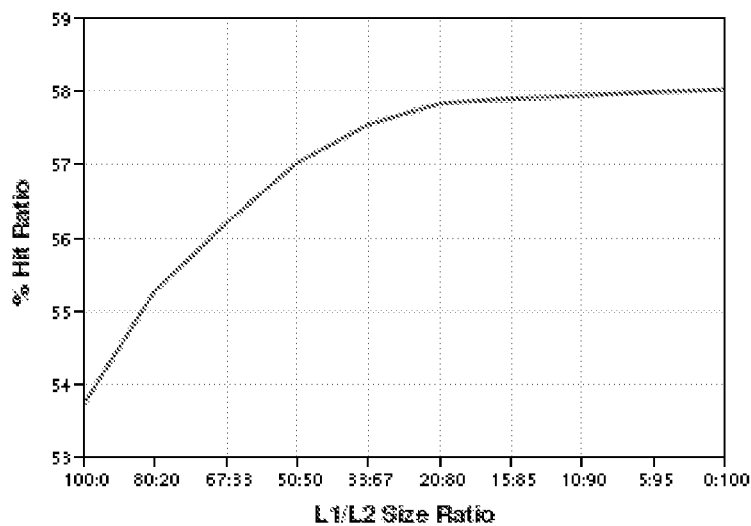
FIG. 8A is a graph of the hit ratio versus the uncompressed to compressed cache size ratio for a 128 MB cache.
Figure 8B:
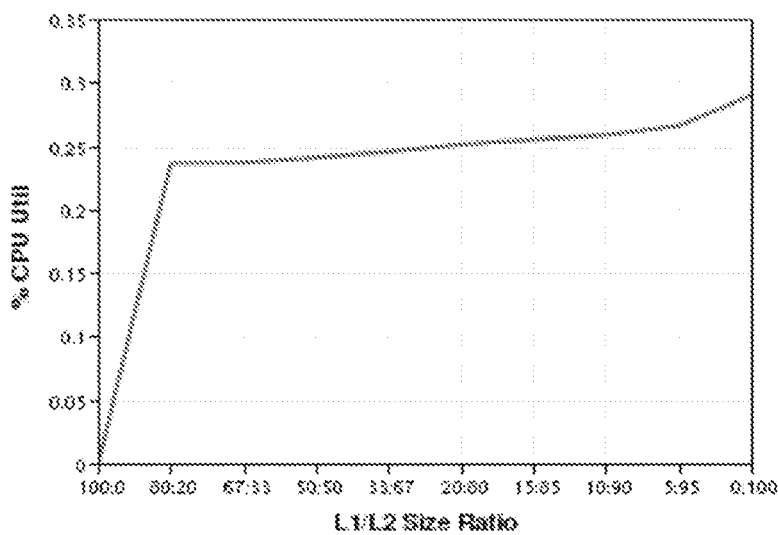
FIG. 8B is a graph of the CPU utilization in maintaining entries in the cache versus the uncompressed to compressed cache size ratio for a 128 MB cache.
Figure 9A:
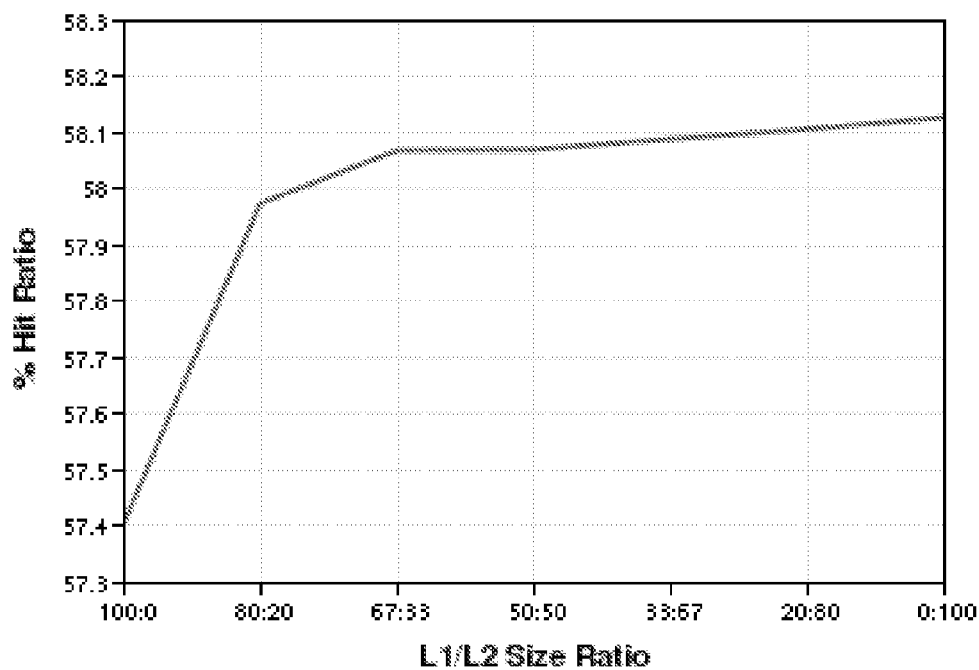
FIG. 9A is a graph of the hit ratio versus the uncompressed to compressed cache size ratio for a 256 MB cache.
Figure 9B:
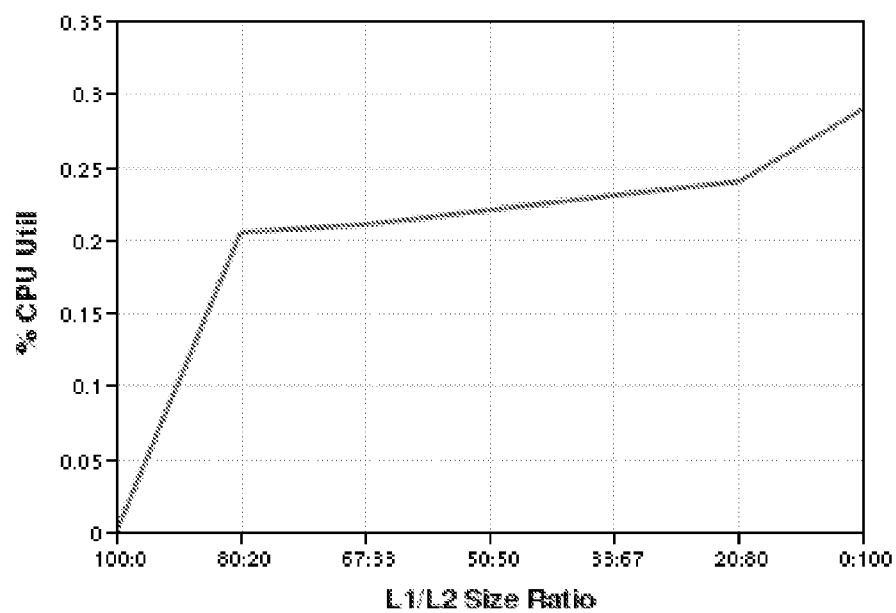
FIG. 9B is a graph of the CPU utilization in maintaining entries in the cache versus the uncompressed to compressed cache size ratio for a 256 MB cache.

FIGS. 7A through 9B illustrate the exemplary relationships between the L1/L2 cache ratio and the resulting cost benefit tradeoffs for different sizes of cache. FIGS. 7-9 result from simulating different L1 to L2 ratios, and measuring the resulting costs and benefits. In these figures, service calls were compressed and decompressed with GZIP, while compression and decompression times and compression ratios were recorded. The eviction policy in use was LRU. FIGS. 7-9 report an L1/L2 ratio in the x-axis where 100:0 means the entire cache is given to L1, simulating a cache with no compression. The opposite end of the x-axis at 0:100 means L2 takes all the memory, simulating a fully compressed cache. In these examples, GZIP achieves compression ratios of 2.6 to 1 and hence one can fit in up to 2.6× more entries into a fully compressed L2 cache.

FIGS. 8A and 8B illustrate the cache size ratio versus the cache hit ratio and percentage of CPU utilization, respectively, for a 128 MB cache. When used in an application server environment, the 128 MB size represents a size which is generally too small to keep a full working set of data. In this scenario, L1 at 0% provides the best results, as illustrated below. As illustrated in Figure A as the size of the L2 cache increases relative to the size of the L1 cache, the cache hit ratio increases by approximately 4.6 percent and receives the greatest improvement as the L2 cache approaches 100%. Note that in this particular measurement, the increase in hit ratios is generally logarithmic. That is, compressing 25 percent of the cache provides nearly 2.3 percent of the increase or half of the achievable benefits.

Figure 7B:
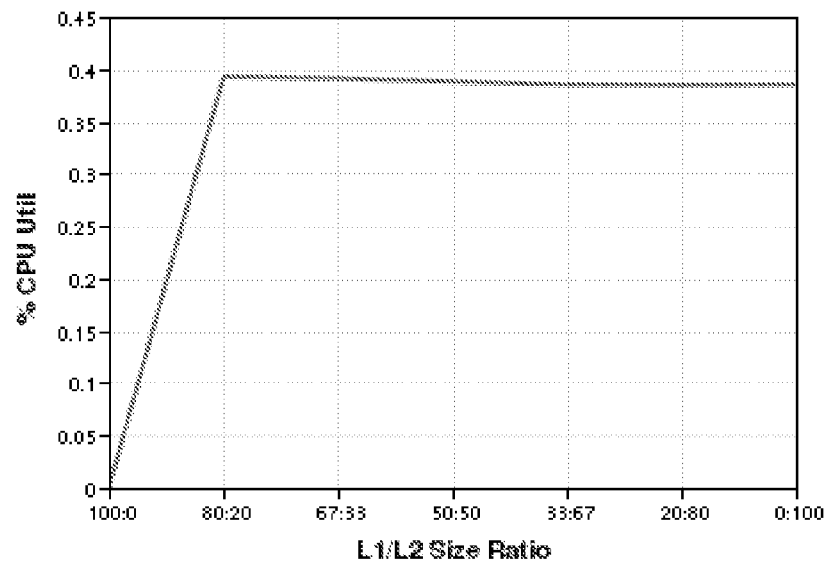
FIG. 7B is a graph of the CPU utilization in maintaining entries in the cache versus the uncompressed to compressed cache size ratio for a 4 MB cache.

FIGS. 7A and 7B illustrate the cache size ratio versus the cache hit ratio and percentage of CPU utilization, respectively, for a 4 MB cache. And FIGS. 9A and 9B illustrate the cache size ratio versus the cache hit ratio and percentage of CPU utilization, respectively, for a 256 MB cache. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

FIGS. 10, 11 and 12 illustrate the operation of the method discussed above for each of the caches represented in FIGS. 4-6.

FIG. 10 represents a portion of the resultant data when utilizing a 4 MB cache. The table of FIG. 10 illustrates, for a sampling of respective L1 sizes ("L1 Ratio"), the percentage hit ratio ("% Hit Ratio), the percentage CPU utilization, ("% CPU Util"), and the calculated values from the method of FIG. 6—the normalized benefit, the normalized cost and the ratio of the benefit change to cost change ("Ben/Cost.").

FIGS. 11 and 12 present the same data and calculations resulting from the method of FIG. 6 for the 128 MB and 256 MB cache simulations respectively. Not all data points for each increment "I" in steps 616-628 are illustrated.

With a 4 MB cache in an application server example, the cache size is generally too small to keep the working set of data. The data indicates that compression always helps as the ratio increases to a maximum at L1=0. In this example, L1=0% provides the best ratio.

Referring to FIG. 11, for a 128 MB cache, benefit-change/cost-change approaches an optimum at L1=15%. With a 256 MB cache, selective compression achieves an optimum ratio at L1=67%.

As illustrated by the examples, the size of the cache, the application(s) using the cache, and the normalization factors can all significantly alter the results of the method. The techniques presented herein are adaptable to each of these different variables. In addition, in the illustrated examples, the increase in costs or benefits generally follow a linear or logarithmic curve. It will be recognized that the curves illustrated in FIGS. 10-12 will change from service to service—some services could have graphs with exponential curves, or even ones with inflection points.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for managing a data cache in an application server having server resources comprising a processor, memory and access to remote resources, comprising:
   (a) determining a group of cache objects for inclusion in a first, uncompressed portion of the data cache, and a second group of cache objects for inclusion in a second, compressed portion of the cache based on a replacement policy;
   (b) compressing ones of said second group of cache objects and storing said objects in the compressed portion of the cache;
   (c) defining a cost metric and a benefit metric based on application operations on objects in the data cache, the cost benefit and benefit metric selected from a plurality of cost benefits and a plurality of benefit metrics including at least one measuring the server resources and at least one measuring cache performance;
   (d) sampling operations on cache objects;
   (e) determining a cost value for the cost metric and a benefit value for the benefit metric for a plurality of relative sizes of the compressed and uncompressed portions of the data cache by computing the cost value to a normalized cost value and the benefit value to a normalized benefit value;
   (f) setting the size of the compressed portion relative to the uncompressed portion based on an optimal cost to benefit ratio of the normalized cost value and the normalized benefit value for said application; and
   (g) repeating steps (e) and (f) continuously.

2. The method of claim 1 wherein the step (e) comprises:
   setting an uncompressed/compressed ratio of the uncompressed portion to the compressed portion to an initial value of 1;
   measuring the normalized cost value and the normalized benefit value for each of a plurality of uncompressed/compressed ratios between 1 and 0 for a group of sampled operations;
   determining a cost value change and a benefit value change for each of the plurality of uncompressed/compressed ratios between 1 and 0; and
   comparing a change ratio of the cost value change to benefit value change to an optimal value, and if the change ratio exceeds the optimal value, setting the optimal value to the change ratio.

3. The method of claim 2 wherein the steps of determining and comparing are repeated for each of the plurality of uncompressed/compressed ratios.

4. The method of claim 2 wherein the step of measuring comprises
   measuring the cost value and benefit value at a current uncompressed/compressed ratio;
   reducing the current uncompressed/compressed ratio by a step interval; and
   repeating said steps of measuring and reducing until the uncompressed/compressed ratio equals zero.

5. The method of claim 2 wherein the steps of determining and comparing comprise:
   determining projected cost values and benefit values using a measured cost values and measured benefit values to formulate and extrapolate the projected values; and
   comparing each of the measured and projected values.

6. The method of claim 2 wherein the steps of determining and comparing are repeated on a plurality of uncompressed/compressed ratios, where these ratios are represented as a search tree, and are explored using a heuristic, comprising a branch and bound algorithm.

7. The method of claim 1 wherein the cost metric comprises one of an increase in: processing unit utilization, or application operation latency.

8. The method of claim 1 wherein the benefit metric comprises one of: an increase in a cache hits ratio; a savings in remote resources; an improvement in effective memory usage; or an improvement in application latencies.

9. The method of claim 1 wherein said step (a) is performed by one of the following replacement policies: a least recently used algorithm, a pseudo least recently used algorithm; a least frequently used algorithm or an adaptive replacement algorithm.

10. The method of claim 1 wherein the step of sampling comprises repeating each of steps (d), (e) and (f) such that steps (e) and (f) are performed over a different set of samples during each repetition.

11. The method of claim 1 wherein the first and second portions may be one of: portions of a single physical memory; two different physical memories; a volatile memory and a non-volatile memory.

12. The method of claim 1 wherein the sampling step includes the steps of:
    sampling a plurality of application operations on the data cache;
    storing cost and benefit values for each operation; and
    at a threshold number of operations, performing said determining and comparing steps.

13. A computer implemented method of operating a data cache containing objects accessed by application operations in a processing device including server resources comprising a processor, memory and access to remote resources, comprising:
    determining a group of most frequently used cache objects for inclusion in a first, uncompressed portion of the data cache, and a second group of less frequently used cache objects for inclusion in a second, compressed portion of the cache;
    compressing ones of said less frequently used cache objects and storing said objects in the compressed portion of the cache;
    dynamically determining a size of the first portion relative to a size of the second portion by creating a normalized cost value and a normalized benefit value and measuring the normalized cost value and normalized benefit value over a series of cache operations, and calculating a normalized benefit-to-cost ratio for said sizes during the application operations, the normalized benefit-to-cost ratio indicative of a performance measurement associated with the application operations for said sizes, the normalized cost value and the normalized benefit value calculated from a plurality of cost benefits and a plurality of benefit metrics including at least one measuring the server resources and at least one measuring cache performance; and setting the size of said first portion and said size of said second portion based on an optimum normalized benefit-to-cost ratio for the application operations accessing said objects.

14. The method of claim 13 further including the step of defining a cost metric and a benefit metric, said cost metric and benefit metric quantifying changes to performance when the size of the first portion or the size of the second portion of the cache changes.

15. The method of claim 13 wherein the step of dynamically determining comprises:
  determining a cost value and a benefit value for a plurality of relative sizes of the first and second portions of the data cache;
  setting the size of the compressed portion relative to the uncompressed portion based on an optimal cost to benefit ratio for said application.

16. The method of claim 13 wherein the step of dynamically determining comprises:
  setting an uncompressed/compressed ratio of the uncompressed portion to the compressed portion to an initial value of 1;
  measuring a cost value and a benefit value for each of a plurality of uncompressed/compressed ratios between 1 and 0;
  determining a cost value change and a benefit value change; and
  comparing a change ratio comprising a benefit-value-change to a cost-value-change to an optimal value, and if the change ratio exceeds the optimal value, setting the optimal value to said change ratio.

17. The method of claim 16 wherein said step of setting the size of the uncompressed portion to the compressed portion sets said sizes based on the uncompressed/compressed ratio achieving said optimal value.

18. The method of claim 16 further including the steps of:
  sampling a plurality of application operations on the data cache;
  storing cost and benefit values for each operation; and
  at a threshold number of operations, performing said determining and comparing steps.

19. The method of claim 15 wherein the steps of determining and comparing are repeated for each of the plurality of uncompressed/compressed ratios.

20. A method for caching data, comprising:
  defining a first, uncompressed portion of a data cache and a second, compressed portion of the data cache, the uncompressed portion including uncompressed objects more frequently accessed by an application than compressed objects in the compressed portion of the data cache;
  defining a cost metric and a benefit metric which affect performance of the application resulting from application access to objects in the first and second portions of the data cache; and
  in a processing device including server resources comprising a processor, memory and access to remote resources, dynamically adjusting a cache size ratio of a first portion size to a second portion size by:
    setting the cache size ratio to an initial value of 1;
    sampling operations on the data cache;
    measuring a cost value and a benefit value for each of a plurality of cache size ratios between 1 and 0, the cost value and the benefit value selected from a plurality of cost benefit metrics and a plurality of benefit metrics, and including at least one of said metrics measuring the server resources and at least one said metrics measuring cache performance;
    normalizing the cost value over the plurality of ratios and normalizing the benefit value over the plurality of ratios;
    determining a cost value change and a benefit value change for each of said plurality of ratios and computing a normalized cost-to-benefit ratio for each cache size ratio; and
  setting the ratio of the uncompressed portion relative to the compressed portion based on an optimal normalized cost-to-benefit ratio for said application, the optimal normalized cost-to-benefit ratio indicative of a performance measurement associated with said application.

21. The method of claim 20 further including the step of defining a cost metric and a benefit metric which affect performance of the application resulting from application access to objects in the first and second portions of the data cache.

22. One or more non-transitory machine-readable storage media having processor readable code stored thereon, said processor readable code programming one or more processors to perform a method comprising:
  (a) determining a group of cache objects for inclusion in a first, uncompressed portion of the data cache, and a second group cache objects for inclusion in the compressed portion of the cache based on a replacement policy;
  (b) compressing ones of said less frequently used cache objects and storing said objects in the compressed portions of the cache;
  (c) sampling operations on cache objects by the application; and
  (d) dynamically adjusting, using a processing device including server resources comprising a processor, memory and access to remote resources, a ratio of a first portion size to a second portion size by:
    (i) determining a cost value and a benefit value for a plurality of relative sizes of the uncompressed and compressed portions of the data cache; at least one of the cost or benefit value measuring the server resources and at least one of the cost or benefit value measuring cache performance;
    (ii) following a threshold number of sampling operations, normalizing the cost value between 0 and 1 and normalizing the benefit value between 0 and 1
    (iii) computing a normalized cost to benefit ratio; and
    (ii) setting the size of the compressed portion relative to the uncompressed portion based on an optimal normalized cost to benefit ratio for said application, the optimal normalized cost to benefit ratio indicative of a performance measurement associated with said application.

23. The one or more non-transitory machine-readable storage media of claim 22 wherein said processor readable code programs the one or more processors to further perform the step of defining a cost metric and a benefit metric which affect performance of the application resulting from application access to objects in the first and second portions of the data cache and wherein step (d) (i) includes:
  setting an size ratio of the first portion to the second portion to an initial value of 1;

measuring a cost value and a benefit value for each of a plurality of size ratios between 1 and 0;

determining a cost value change and a benefit value change for each size ratio; and comparing a change ratio of the cost-value-change-to-benefit-value-change to an optimal value, and if the change ratio exceeds this optimal value, setting the optimal value to said change ratio.

24. A system that caches data, comprising:

a processing device including server resources comprising a processor, memory and access to remote resources;

a non-volatile memory;

volatile memory including at least a first, uncompressed data cache and a second, compressed data cache, the uncompressed data cache including uncompressed objects more frequently accessed by an application than compressed objects in the compressed portion of the data cache; and a storage device including processor readable code to instruct the processing device to perform a method comprising:

determining a group of most frequently used cache objects for inclusion in the uncompressed data cache, and a second group of less frequently used cache objects for inclusion in the compressed data cache;

compressing ones of said less frequently used cache objects and storing said objects in the compressed portions of the cache;

dynamically adjusting a ratio of the size of the first portion to the second portion by:

setting the ratio to an initial value of 1;

sampling operations on each data cache;

measuring a cost value and a benefit value for each of a plurality of ratios between 1 and 0, at least one of the cost or benefit value measuring the server resources and at least one of the cost or benefit value measuring cache performance;

following a threshold number of sampling operations, normalizing the cost value over the plurality of ratios and normalizing the benefit value over the plurality of ratios;

after said normalizing, determining a cost value change and a benefit value change for each of said plurality of values and computing a normalized cost-to-benefit ratio for each cache size ratio; and setting the size of the uncompressed data cache relative to the compressed portion based on an optimal cost-to-benefit ratio for said application, the optimal cost-to-benefit ratio indicative of a performance measurement associated with said application.

* * * * *